US 011903536B2

(12) United States Patent
Nakao

(10) Patent No.: US 11,903,536 B2
(45) Date of Patent: Feb. 20, 2024

(54) AUTOMATIC LIQUID SOAP SUPPLYING MECHANISM FOR AIRCRAFT LAVATORY UNIT

(71) Applicant: The Yokohama Rubber Co., LTD., Tokyo (JP)

(72) Inventor: Kazushi Nakao, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 44 days.

(21) Appl. No.: 17/042,040

(22) PCT Filed: Dec. 27, 2018

(86) PCT No.: PCT/JP2018/048218
§ 371 (c)(1),
(2) Date: Sep. 25, 2020

(87) PCT Pub. No.: WO2019/187450
PCT Pub. Date: Oct. 3, 2019

(65) Prior Publication Data
US 2021/0076883 A1 Mar. 18, 2021

(30) Foreign Application Priority Data

Mar. 26, 2018 (JP) .............................. JP2018-057624

(51) Int. Cl.
A47K 5/12 (2006.01)
B64D 11/02 (2006.01)

(52) U.S. Cl.
CPC .......... A47K 5/1217 (2013.01); A47K 5/1207 (2013.01); B64D 11/02 (2013.01); A47K 2201/02 (2013.01)

(58) Field of Classification Search
CPC ...... A47K 5/1217; A47K 5/12; A47K 5/1207; A47K 2201/02; B64D 11/02; B65D 83/262
(Continued)

(56) References Cited

U.S. PATENT DOCUMENTS 7,837,065 B2 * 11/2010 Furner ................. B65D 83/262
222/52
8,308,027 B2 * 11/2012 Law ..................... A47K 5/1217
222/52

(Continued)

FOREIGN PATENT DOCUMENTS

JP H01-124874 8/1989
JP 2009-137511 6/2009

(Continued)

OTHER PUBLICATIONS

International Search Report for International Application No. PCT/JP2018/048218 dated Mar. 12, 2019, 4 pages, Japan.

Primary Examiner — Charles P. Cheyney
(74) Attorney, Agent, or Firm — Thorpe North & Western

(57) ABSTRACT

A liquid soap dispenser having a press-type nozzle that dispenses liquid soap from the nozzle by being pressed by hand includes a dispenser body, a nozzle, a pump, and the like. The dispenser body is supported inside an upper storage portion by a lower bracket and an upper bracket. A connecting member connects a vertically moving member and the nozzle. When a user places a hand below the nozzle, a human body detection unit detects the hand, and a control unit causes a motor to rotate in a forward direction and raise the vertically moving member from a lower limit position to an upper limit position; and by raising the nozzle from the lower limit position to the upper limit position via the connecting member, liquid soap is automatically dispensed from the nozzle.

4 Claims, 7 Drawing Sheets

(58) Field of Classification Search
USPC .................. 222/180–181.3, 52, 333, 504, 63
See application file for complete search history.

(56) References Cited

U.S. PATENT DOCUMENTS

| | | | |
|---|---|---|---|
| 11,027,909 B2* | 6/2021 | Casper | ................ B01F 15/0445 |
| 2005/0247735 A1* | 11/2005 | Muderlak | ............ A47K 5/1217 |
| | | | 222/190 |
| 2010/0051640 A1* | 3/2010 | Chen | .................... A47K 5/1209 |
| | | | 222/52 |
| 2014/0203045 A1 | 7/2014 | Mann et al. | |
| 2014/0209631 A1* | 7/2014 | Lin | ...................... A47K 5/1217 |
| | | | 222/52 |
| 2015/0083754 A1 | 3/2015 | Proper et al. | |
| 2015/0190827 A1* | 7/2015 | Ophardt | ................... A47K 5/12 |
| | | | 222/153.09 |
| 2015/0266582 A1* | 9/2015 | Koyama | ................ B64D 11/02 |
| | | | 244/118.5 |
| 2016/0039522 A1 | 2/2016 | Koyama et al. | |

FOREIGN PATENT DOCUMENTS

| | | |
|---|---|---|
| JP | 2012-144283 | 8/2012 |
| JP | 2016-540624 | 12/2016 |
| WO | WO 2012/096377 | 7/2012 |
| WO | WO 2014/116581 | 7/2014 |
| WO | WO 2014/141701 | 9/2014 |
| WO | WO 2015/048210 | 4/2015 |

* cited by examiner

AUTOMATIC LIQUID SOAP SUPPLYING MECHANISM FOR AIRCRAFT LAVATORY UNIT

TECHNICAL FIELD

The present technology relates to an automatic liquid soap supplying mechanism for an aircraft lavatory unit.

BACKGROUND ART

An aircraft lavatory unit includes a counter table provided with a washbasin; in the counter table, an automatic faucet is provided above the washbasin for discharging water, and a liquid soap dispenser is disposed above the washbasin for dispensing liquid soap.

The liquid soap dispenser has: a dispenser body that contains liquid soap and that has a vertically long shape; and a pump that sucks up the liquid soap contained in the dispenser body by moving in the longitudinal direction of the dispenser body, the pump being provided in an end portion in the longitudinal direction of the dispenser body, and the liquid soap dispenser is configured to dispense liquid soap from the nozzle via the pump when the nozzle is pressed by hand.

Therefore, in order to use the liquid soap, the user has to touch the nozzle with his or her hand; however, in recent years, an automatic liquid soap supplying mechanism that automatically dispenses liquid soap in the aircraft lavatory unit is also desired from the aspect of hygiene.

However, in an aircraft lavatory unit that is already equipped with a liquid soap dispenser, the nozzle of which is pressed by hand, there is a problem in that it would be a major design change to redesign all the parts including this liquid soap dispenser from the beginning, and together with the cost being high, it is not possible to switch in a short period of time to an automatic liquid soap supplying mechanism that automatically dispenses liquid soap.

SUMMARY

The present technology provides in an aircraft lavatory unit that is already equipped with a liquid soap dispenser, the nozzle of which is pressed by hand, an automatic liquid soap supplying mechanism for an aircraft lavatory unit having a minimum number of parts and that automatically dispenses liquid soap in a short period of time.

The present technology is an automatic liquid soap supplying mechanism for an aircraft lavatory unit,
the aircraft lavatory unit including:
a washbasin on a counter table above a floor;
an automatic faucet that discharges water into the washbasin;
a storage portion provided above or below the counter table; and
a liquid soap dispenser,
the liquid soap dispenser having:
a dispenser body having a vertically long shape and storing liquid soap; and
a nozzle provided at an end portion in a longitudinal direction of the dispenser body for dispensing the liquid soap stored in the dispenser body by being moved in the longitudinal direction,
the automatic liquid soap supplying mechanism for an aircraft lavatory unit being provided with:
a bracket attached to a wall of the aircraft lavatory unit inside the storage portion above or below the counter table, the bracket holding the dispenser body such that the longitudinal direction of the dispenser body is in a vertical direction and such that the nozzle is exposed from the storage portion and positioned above the washbasin;
an actuator supported by the wall, disposed inside the storage portion, and having a vertically moving member that moves along the vertical direction on a side of the dispenser body;
a connecting member that connects the vertically moving member and the nozzle;
a human body detection unit that detects that a hand is located near the nozzle; and
a control unit that activates the actuator based on a detection result of the human body detection unit to move the vertically moving member along the longitudinal direction of the dispenser body.

Moreover, the present technology is characterized in that the bracket includes;
a lower bracket disposed at a lower portion of the dispenser body; and
an upper bracket disposed at an upper portion of the dispenser body, and
the dispenser body
is supported by the lower bracket in a state of being able to be inserted and removed in a direction away from the wall, so as not to be able to move in a direction orthogonal to the longitudinal direction of the dispenser body and so as not to be able to move downward and
is supported by the upper bracket so as not to be able to move upward.

In addition, the present technology is characterized in that the actuator is attached to the bracket; and
the actuator is indirectly supported by the wall via the bracket.

The present technology is also characterized in that the connecting member has a vertically extending portion that extends in the vertical direction, and
at least a portion of the vertically extending portion is formed of a flexible member that is flexible.

Furthermore, the present technology is characterized in that at least a portion of the vertically extending portion that is formed of a flexible member that is flexible is located inside the storage portion.

According to the present embodiment, in an aircraft lavatory unit that is already equipped with a liquid soap dispenser, the nozzle of which is pressed by hand, an automatic liquid soap supplying mechanism is configured so that liquid soap is automatically dispensed using the liquid soap dispenser.

Therefore, without requiring a major design change, the automatic liquid soap supplying mechanism may be configured with a minimum number of parts, and in an aircraft lavatory unit already equipped with a liquid soap dispenser, the nozzle of which is pressed by hand, it is possible to switch to the automatic liquid soap supplying mechanism in a short period of time, which is advantageous.

Moreover, according to the present technology, the dispenser body is supported by the lower bracket and the upper bracket so as to be able to be inserted or removed in the direction going away from the wall, which is advantageous in that supplying liquid soap to the dispenser body may be performed smoothly.

In addition, according to the present technology, the actuator may be attached to the upper bracket in advance, so compared with a case in which the actuator is directly attached to the wall, this is advantageous in that the efficiency of assembly work is improved, and in an aircraft lavatory unit that is already equipped with a liquid soap dispenser, the nozzle of which is pressed by hand, switching to the automatic liquid soap supplying mechanism may be performed in a short period of time.

Furthermore, according to the present technology, at least a portion of the vertically extending portion is configured by a flexible member, so even though a user moves the nozzle by hand, the moved stroke may be absorbed by the flexible member being bent, which is advantageous in that the nozzle may be moved smoothly by hand, and the supply of liquid soap may be performed without being hindered and without breaking the actuator or the like.

In addition, according to the present technology, by placing at least a portion of the vertically extending portion that is formed of a flexible member that is flexible inside the storage portion, the bending of the flexible member is not visible from the outside, which is advantageous in improving the appearance of the automatic liquid soap supplying mechanism.

DETAILED DESCRIPTION

Hereinafter, embodiments of the present technology will be described with reference to the drawings.

First Embodiment

First, a first embodiment will be described with reference to FIGS. 1 to 5.

Figure 1:
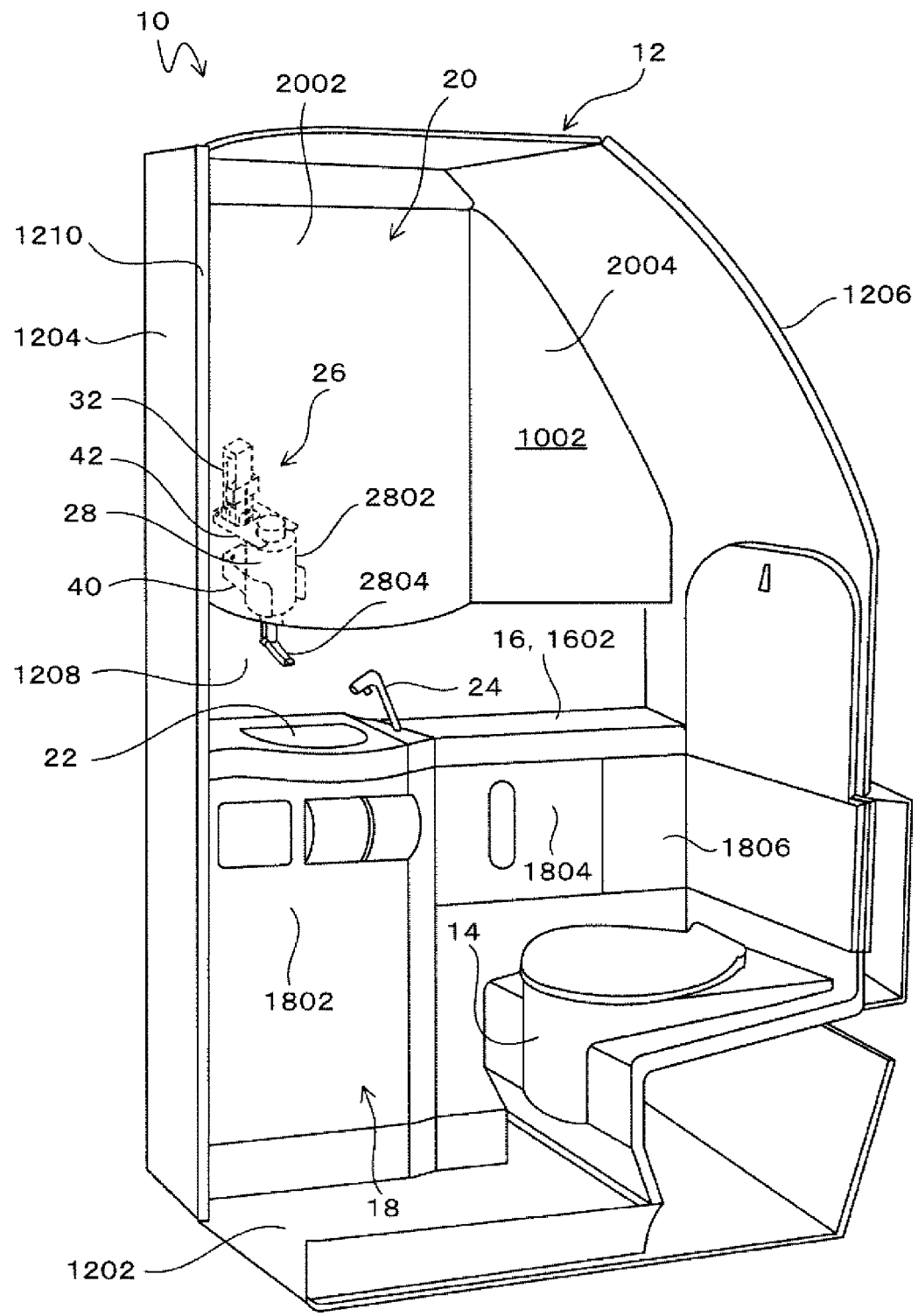
FIG. 1 is a perspective view of an aircraft lavatory unit to which an automatic liquid soap supplying mechanism according to a first embodiment is applied, with one side wall and an entrance/exit door omitted.

As illustrated in FIG. 1, a structural body 12 of an aircraft lavatory unit 10 includes: a floor plate 1202, a front wall 1204 and a rear wall 1206 standing upright from both ends in a longitudinal direction of the floor plate 1202, and a pair of side walls 1208 standing upright from both ends in a direction orthogonal to the longitudinal direction of the floor plate 1202, and the structural body 12 also includes: an entrance 1210 on the front wall 1204 and an entrance/exit door that opens and closes the entrance 1210, with one side wall 1208 of the pair of side walls 1208 and the entrance/exit door being omitted in FIG. 1.

The interior of the structural body 12 serves as a lavatory 1002, a toilet 14 is disposed in front of the rear wall 1206, a counter table 16 is provided in a middle portion of the side wall 1208 in a height direction, a lower storage portion 18 for storing a trash can and the like is provided below the counter table 16, and an upper storage portion 20 in which equipment such as a tissue and the like is stored is provided at a section separated upward from the counter table 16.

The lower storage portion 18 is configured to be opened and closed by a plurality of lower doors 1802, 1804, 1806, and the upper storage portion 20 is configured to be opened and closed by a mirror-equipped door 2002 and a door 2004 on the side thereof.

A washbasin 22 is provided on the upper surface 1602 of the counter table 16.

The counter table 16 is provided with an automatic faucet 24 capable of discharging water into the washbasin 22, and the upper storage portion 20 is provided with an automatic liquid soap supplying mechanism 26 capable of dispensing liquid soap to the washbasin 22.

The automatic faucet 24 is composed of various conventionally known components such as a spout for discharging water into the washbasin 22, a water supply channel that guides water from a water supply source to the spout, a human body detecting sensor provided near the spout, an on-off valve that opens and closes the water supply channel based on the detection operation of the human body detecting sensor, and the like.

As illustrated in FIGS. 2 to 5, the automatic liquid soap supplying mechanism 26 is configured to include: a liquid soap dispenser 28, a bracket 30, an actuator 32, a connecting member 34, a human body detection unit 36, a control unit 38, and the like.

The liquid soap dispenser 28 is a commercial product that is disposed on the counter table 16 and has a press-type nozzle that dispenses liquid soap from the nozzle by being pressed by hand, and the liquid soap dispenser 28 includes: a dispenser body 2802, a nozzle 2804, a pump (not illustrated), and the like.

Figure 4:
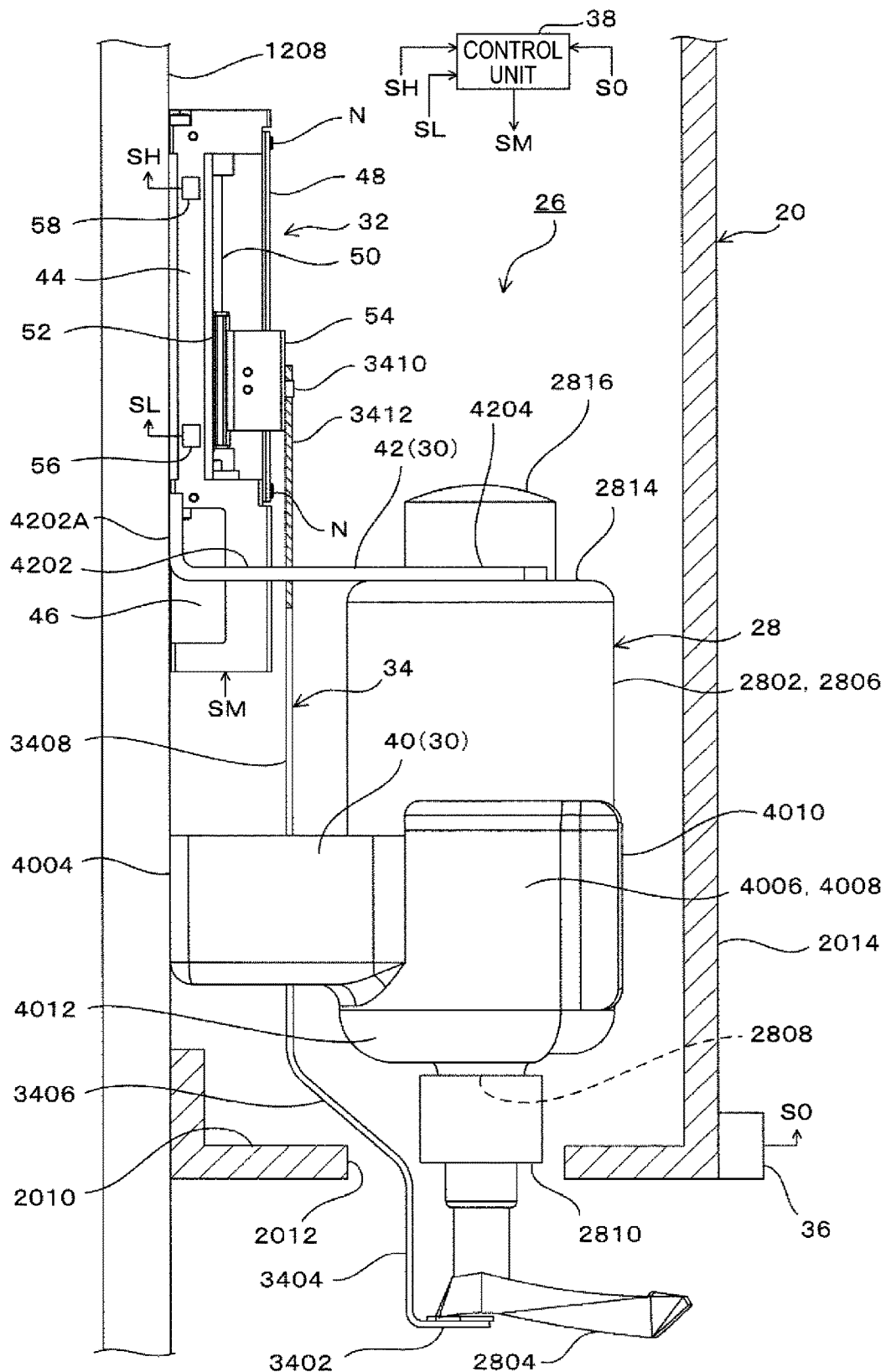
FIG. 4 is a side view of an automatic liquid soap supplying mechanism according to a first embodiment.

As illustrated in FIG. 4, liquid soap is contained in the dispenser body 2802, and the dispenser body 2802 has a body portion 2806 having a cylindrical shape that is long in a vertical direction.

An opening 2808 for replenishing liquid soap is provided at an end portion of the body portion 2806 in a longitudinal direction, the opening 2808 is opened and closed by a cap 2810, and the nozzle 2804 is provided so as to project from the cap 2810.

The liquid soap dispenser 28 is disposed and used on the counter table 16, so the shape of the nozzle 2804 is formed so as to be easily pressed by hand, and the nozzle 2804 is pressed into the dispenser body 2802 side to activate the pump, so as to dispense liquid soap from a dispensing outlet 2812 (see FIG. 3) provided at a tip end of the nozzle 2804.

In the present embodiment, a commercially available product of the liquid soap dispenser 28 that is disposed and used on the counter table 16 is used upside down, so the nozzle 2804 is able to move up and down between a lower limit position away from the cap 2810 and an upper limit position close to the cap 2810, and the nozzle 2804 is biased by a spring (not illustrated) so as to normally be located at the lower limit position.

In addition, a commercially available product of the liquid soap dispenser 28 that is disposed and used on the counter table 16 is used upside down, so in the case of the liquid soap dispenser 28 having a suction tube connected to the nozzle 2804 and reaching a bottom portion of the dispenser body 2802, the suction tube is cut near the cap 2810.

As illustrated in FIGS. 2 to 5, in the present embodiment, the bracket 30 includes a lower bracket 40 and an upper bracket 42.

As illustrated in FIG. 4, the lower bracket 40 and the upper bracket 42 are attached to the side wall 1208 of the structural body 12 inside the upper storage portion 20.

The dispenser body 2802 is supported by the lower bracket 40 and the upper bracket 42 inside the upper storage portion 20 with the longitudinal direction of the dispenser body 2802 oriented in a vertical direction, and the nozzle 2804 is exposed below a bottom wall 2010 through an opening 2012 of the bottom wall 2010 of the upper storage portion 20 and is located above the washbasin 22.

Figure 2:
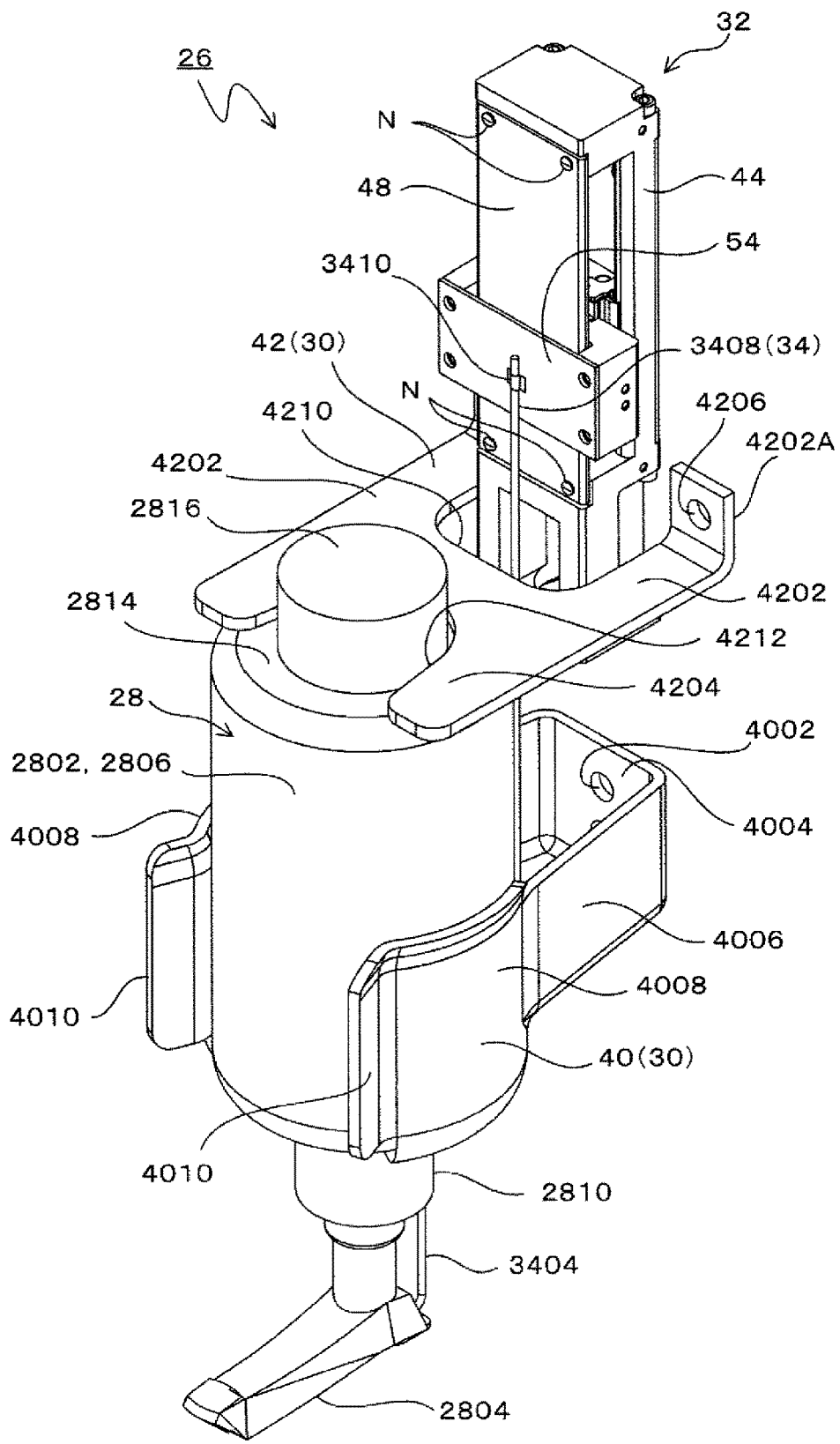
FIG. 2 is a perspective view of an automatic liquid soap supplying mechanism according to a first embodiment as viewed at an angle from above.
Figure 3:
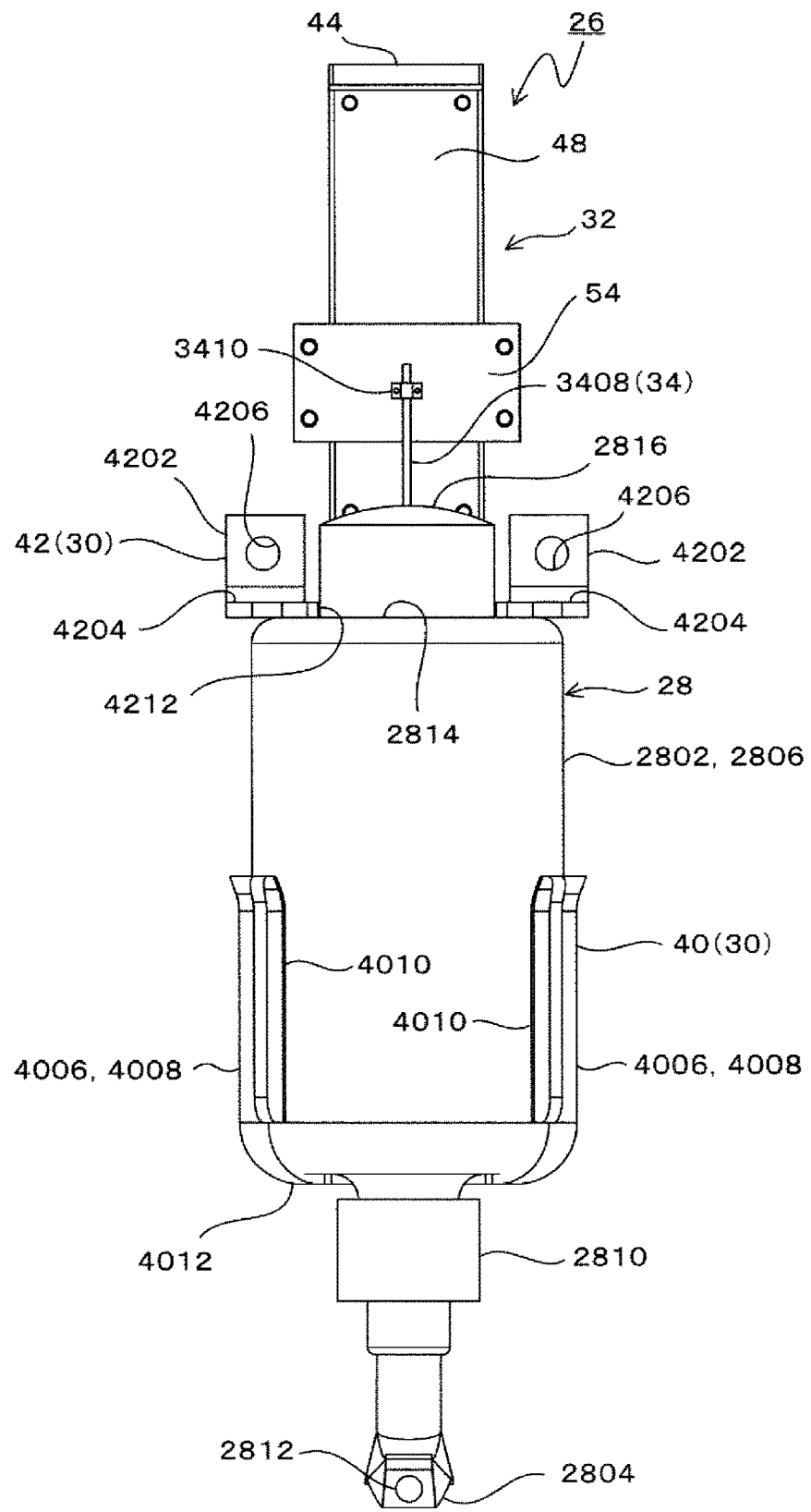
FIG. 3 is a front view of an automatic liquid soap supplying mechanism according to a first embodiment.

As illustrated in FIGS. 2 to 4, the lower bracket 40 is provided with: a mounting plate portion 4004 in which a screw insertion hole 4002 is formed; and a pair of holding plate portions 4006 projecting from both sides of the mounting plate portion 4004 that come in elastic contact with the body portion 2806 on the cap 2810 side of the dispenser body 2802 from both sides in a diametrical direction to hold the body portion 2806 on the cap 2810 side, the pair of holding plate portions 4006 are elastically deformable, and the mounting plate portion 4004 is attached to the side wall 1208 by engaging the screw that is inserted through the screw insertion hole 4002 with the female thread of the side wall 1208.

Front portions of the pair of holding plate portions 4006 are formed by arc surface portions 4008 corresponding to an outer diameter of the body portion 2806 so that the body portion 2806 on the cap 2810 side may be held, and an operation plate portion 4010 is provided at each tip end of a pair of the arc surface portions 4008 so as to project from each tip end of the pair of arc surface portions 4008 in directions away from each other and to open the pair of holding plate portions 4006.

Furthermore, a locking plate portion 4012 that locks from below the end portion on the cap 2810 side of the body portion 2806 is provided on each lower end of the pair of arc surface portions 4008.

As illustrated in FIGS. 2 to 5, the upper bracket 42 has a pair of mounting plate portions 4202, and a contact plate portion 4204 that is connected to the pair of mounting plate portions 4202 and is capable of coming in contact with an end portion of the dispenser body 2802 on the side opposite to the cap 2810.

A screw insertion hole 4206 is formed in each base flange 4202A of the pair of mounting plate portions 4202, and the mounting plate portion 4202 is attached to the side wall 1208 by engaging the screw that is inserted through the screw insertion hole 4206 with the female thread of the side wall 1208.

Figure 5:
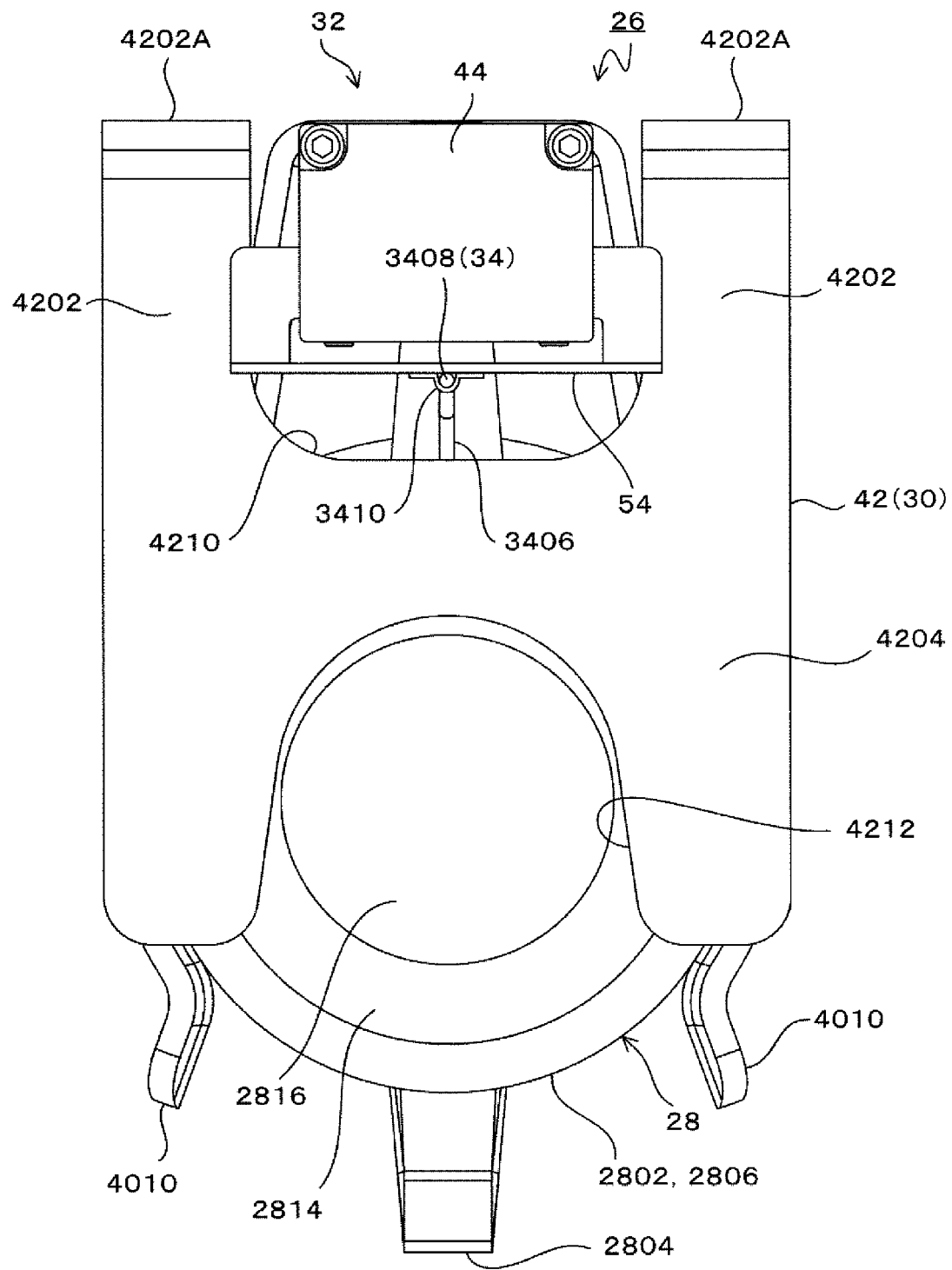
FIG. 5 is a plan view of an automatic liquid soap supplying mechanism according to a first embodiment.

As illustrated in FIGS. 2 and 5, the pair of mounting plate portions 4202 are separated from each other in a direction connecting the front wall 1204 and the rear wall 1206, and a cutout portion 4210 for disposing the actuator 32 is provided between the pair of mounting plate portions 4202 and the contact plate portion 4204.

As illustrated in FIG. 2, FIG. 3, and FIG. 5, the contact plate portion 4204 has a cutout portion 4212 that straddles a protruding portion 2816 of an end portion 2814 on the opposite side of the cap 2810 of the dispenser body 2802, and as illustrated in FIG. 2, FIG. 3 and FIG. 4, both side portions of the cutout portion 4212 come in contact from above with the end portion 2814 around the protruding portion 2816.

Accordingly, the bracket 30 is attached to the side wall 1208 inside the upper storage portion 20 above the counter table 16 and holds the dispenser body 2802 so that the longitudinal direction of the dispenser body 2802 is oriented in the vertical direction and that the nozzle 2804 is exposed from the upper storage portion 20 and positioned above the washbasin 22.

More specifically, the dispenser body 2802 of the liquid soap dispenser 28 is supported by the lower bracket 40 in a state of being able to be inserted or removed in a direction away from the side wall 1208, so as not to be able to move in the diametrical direction of the body portion 2806, or in other words, is supported in a direction so as not to be able to move in a direction orthogonal to the longitudinal direction of the dispenser body 2802 and so as not to be able to move downward.

Moreover, the dispenser body 2802 is supported by the upper bracket 42 so as not to be able to move upward and is also supported so as not to be able to move in the diametrical direction of the body portion 2806 except in the direction away from the side wall 1208.

Accordingly, the dispenser body 2802 is supported by the lower bracket 40 and the upper bracket 42 so as to be able to be inserted and removed in the direction away from the side wall 1208, allowing the dispenser body 2802 to be smoothly replenished with liquid soap.

As illustrated in FIG. 4, the actuator 32 is disposed inside the upper storage portion 20 and is provided on a side of the dispenser body 2802 between the dispenser body 2802 and the side wall 1208.

The actuator 32 is configured to include: a frame 44 attached to the side wall 1208, a motor 46 supported at a lower portion of the frame 44, a guide plate 48 attached to an upper portion of the frame 44 and extending vertically, a screw shaft 50 that is rotated by the motor 46, and a vertically moving member 54 that supports a nut 52 that is engaged with the screw shaft 50 and is coupled so as to be able to slide vertically on the guide plate 48.

When the motor 46 operates in the forward/reverse direction, the screw shaft 50 rotates in the forward/reverse direction, and the vertically moving member 54 that is prevented from rotating by the guide plate 48 moves up or down on the side of the dispenser body 2802.

Bolts N are inserted through the upper and lower four corners of the guide plate 48, and these bolts N are inserted through the frame 44 and engaged with female threads in the side wall 1208, and thus the guide plate 48 is attached to the frame 44, and the frame 44 is attached to the side wall 1208.

As illustrated in FIG. 4, the connecting member 34 connects the vertically moving member 54 and the nozzle 2804.

The connecting member 34 has: an attachment portion 3402 that is attached to the nozzle 2804 and that extends from the section attached to the nozzle 2804 toward the side wall 1208; a lower side vertically extending portion 3404 extending upward from an end portion of the attachment portion 3402; an inclined portion 3406 that rises at an angle from an upper end of the lower side vertically extending portion 3404 along the cap 2810 and a bottom surface of the dispenser body 2802 toward the side wall 1208; and an upper side vertically extending portion 3408 that extends upward from an upper end of the inclined portion 3406 on the side of the dispenser body 2802, the upper end thereof being attached to the vertically moving member 54 via a bracket 3410.

The lower side vertically extending portion 3404 and the upper side vertically extending portion 3408 extend in the vertical direction.

The connecting member 34 may be formed of a non-flexible linear member made of steel or hard synthetic resin in all its parts, but may be configured such that at least a portion of the connecting member 34 in the longitudinal direction is a flexible member such as a flexible wire or the like.

By interposing a flexible member in the connecting member 34 in this way, when the user of the aircraft lavatory unit 10 presses up on the nozzle 2804 by hand, the raised stroke is absorbed by the flexible member being bent, allowing the nozzle 2804 to be smoothly raised by hand.

In the present embodiment, as illustrated in FIG. 4, the connecting member 34 is configured by a flexible member 3412 from an upper end of the upper side vertically extending portion 3408 attached to the vertically moving member 54 by the bracket 3410 to an intermediate portion in the vertical direction of the upper side vertically extending portion 3408; so even though the flexible member 3412 bends when the nozzle 2804 is pressed up by a hand, the flexible member 3412 is positioned inside the upper storage portion 20 and thus cannot be seen from the outside, allowing the appearance of the automatic liquid soap supplying mechanism 26 to be improved.

Note that even when the connecting member 34 is configured to include the flexible member 3412, when liquid soap is supplied, the vertically moving member 54 rises and pulls up the nozzle 2804 via the flexible member 3412, and a tensile force acts on the flexible member 3412, so the liquid soap may be supplied without being hindered, and even though a portion or all of the lower side vertically extending portion 3404 and the upper side vertically extending portion 3408 is configured by the flexible member 3412, the flexible member 3412 does not come into contact with other sections when the nozzle 2804 is moved up and down by the vertically moving member body 54, and thus liquid soap may be supplied without being hindered.

In addition, as illustrated in FIG. 4, the frame 44 is also provided with a lower limit position sensor 56 and an upper limit position sensor 58 for detecting a lower limit position and a upper limit position of the vertically moving member 54 for determining the movement range of the nozzle 2804 by the vertically moving member 54.

When the lower limit position sensor 56 detects the lower limit position of the vertically moving member 54, the lower limit position sensor 56 supplies a detection signal SL to the control unit 38 described later.

When the upper limit position sensor 58 detects the upper limit position of the vertically moving member 54, the upper limit position sensor 58 supplies a detection signal SH to the control unit 38 described later.

The lower limit position of the vertically moving member 54 is set in correspondence to the lower limit position of the nozzle 2804, and the upper limit position of the vertically moving member 54 is set in correspondence to the stroke amount of the nozzle 2804 that is sufficient for dispensing a specified amount of liquid soap from the nozzle 2804.

The lower limit position sensor 56 and the upper limit position sensor 58 only need to be able to detect the position of the vertically moving member 54, and various conventionally known sensors such as a proximity sensor, a limit switch and the like may be used.

As illustrated in FIG. 4, the human body detection unit 36 detects that a hand is located near the nozzle 2804, and when a hand is detected, supplies a detection signal S0 to the control unit 38 described below.

In the present embodiment, the human body detection unit 36 is provided at a section close to the nozzle 2804 at a lower portion of a side wall 2014 extending upward from an edge portion of the bottom wall 2010 on the side away from the side wall 1208 of the upper storage portion 20.

As the human body detection unit 36, various conventionally known sensors, such as an infrared sensor that has a light emitting unit that emits infrared light and a light receiving unit that receives the reflected light of the infrared light emitted from the light emitting unit, the infrared sensor detecting a human body depending on whether or not reflected light is received by the receiving unit, or the like may be used.

The control unit 38 activates the actuator 32 based on the detection result of the human body detection unit 36 to move the vertically moving member 54 along the longitudinal direction of the dispenser body 2802.

More specifically, the control unit 38 performs the rotation control of the motor 46 by supplying a drive signal SM to the motor 46 of the actuator 32 based on the detection signal S0 supplied from the human body detection unit 36.

The rotation control of the motor 46 by the control unit 38 is performed by rotating the motor 46 in a forward direction and reverse direction and by stopping the motor 46 based on the detection signals SL and SH supplied from the lower limit position sensor 56 and the upper limit position sensor 58.

The operation of the automatic liquid soap supplying mechanism 26 of the present embodiment is as follows.

When the user of the aircraft lavatory unit 10 places his/her hand below the nozzle 2804, the human body detection unit 36 detects the hand and supplies the detection signal S0 to the control unit 38.

As a result, the control unit 38 rotates the motor 46 in the forward direction to raise the vertically moving member 54 from the lower limit position to the upper limit position, and raise the nozzle 2804 from the lower limit position to the upper limit position via the connecting member 34, thereby causing a specified amount of liquid soap to be automatically dispensed from the nozzle 2804.

After the liquid soap is dispensed, the control unit 38 causes the motor 46 to rotate in the reverse direction to return the vertically moving member 54 from the upper limit position to the lower limit position, and as a result, the nozzle 2804 is returned from the upper limit position to the lower limit position by a spring (not illustrated).

According to the present embodiment, in the aircraft lavatory unit 10 that is already equipped with the liquid soap dispenser 28, the nozzle 2804 of which is pressed by hand, the automatic liquid soap supplying mechanism 26 is configured so that liquid soap is automatically dispensed using the liquid soap dispenser 28.

Therefore, without requiring a major design change, the automatic liquid soap supplying mechanism 26 may be configured with a minimum number of parts, and in the aircraft lavatory unit 10 already equipped with the liquid soap dispenser 28, the nozzle 2804 of which is pressed by hand, it is possible to switch to the automatic liquid soap supplying mechanism 26 in a short period of time.

Moreover, the nozzle 2804 is exposed downward from the upper storage portion 20 above the washbasin 22, except for the nozzle 2804 and the lower side vertically extending portion 3404 of the connecting member 34, the remaining section of the automatic liquid soap supplying mechanism 26 is hidden in the upper storage portion 20. In other words, the actuator 32, the bracket 30, the inclined portion 3406 of the connecting member 34, and the upper side vertically extending portion 3408 are hidden in the upper storage portion 20, so the appearance of the automatic liquid soap supplying mechanism 26 is excellent.

In addition, in the present embodiment, a portion of the upper side vertically extending portion 3408 is configured by the flexible member 3412, so even in a case where the user of the aircraft lavatory unit 10 raises the nozzle 2804 by hand, the raised stroke may be absorbed by the flexible member 3412 being bent, so the nozzle 2804 may be smoothly raised by hand, and the liquid soap may be supplied without breaking the actuator 32 and the like.

Second Embodiment

Figure 6:
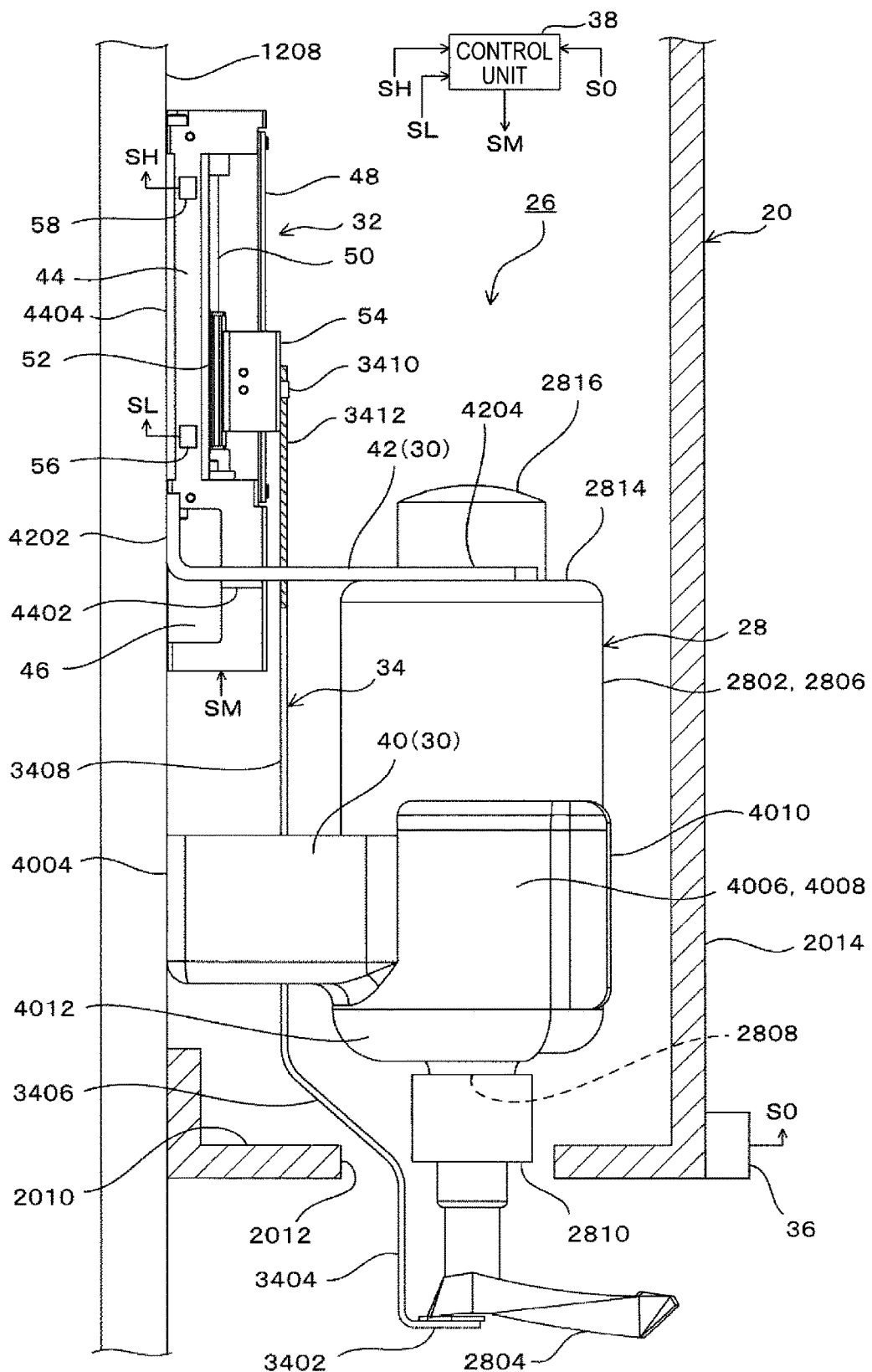
FIG. 6 is a side view of an automatic liquid soap supplying mechanism according to a second embodiment.

Next, a second embodiment will be described with reference to FIG. 6.

Note that in the following description of the second embodiment, the same sections and members as those in the first embodiment are designated by the same reference numerals, and a description thereof will be omitted, with the description focusing on the sections that are different.

In the second embodiment, flanges 4402 are provided on both sides of the frame 44 of the actuator 32, and the actuator 32 is disposed by attaching the flanges 4402 to the pair of mounting plate portions 4202.

A rear surface 4404 of the frame 44 facing the side wall 1208 is in contact with the side wall 1208.

Accordingly, in this second embodiment, the actuator 32 is indirectly supported by the side wall 1208 via the bracket 30.

According to such a second embodiment, in addition to displaying the effects of the first embodiment, the actuator 32 may be attached to the upper bracket 42 in advance, so compared with a case in which the actuator 32 is directly attached to the side wall 1208, this embodiment is advantageous in that the efficiency of assembly work is improved, and in the aircraft lavatory unit 10 that is already equipped with the liquid soap dispenser 28, the nozzle 2804 of which is pressed by hand, switching to the automatic liquid soap supplying mechanism 26 may be performed in a short period of time.

Third Embodiment

Next, a third embodiment will be described with reference to FIG. 7.

In the first and second embodiments, a commercially available product of the liquid soap dispenser 28 that is disposed and used on the counter table 16 is used upside down; however, in this third embodiment, the automatic liquid soap supplying mechanism 26 is configured by using the commercially available product of the liquid soap dispenser 28 in the orientation according to the specifications of the commercially available product, and the dispenser body 2802, the bracket 30, and the actuator 32 are disposed in the lower storage portion 18.

In other words, the dispenser body 2802 with the nozzle 2804 facing upward is supported inside the lower storage portion 18 by the lower bracket 40 and the upper bracket 42, the nozzle 2804 is exposed upward from an opening 1610 in the counter table 16, and the tip end of the nozzle 2804 is located above the washbasin 22.

The lower bracket 40 and the upper bracket 42 are attached to the side wall 1208 in a similar manner to the first and second embodiments; however, the shape of the locking plate portion 4012 provided on the pair of holding plate portions 4006 of the lower bracket 40 differs from the first and second embodiments, and that the cutout portion 4210 is not provided in the upper bracket 42 also differs from the first and second embodiments.

The bracket 30 composed of the lower bracket 40 and the upper bracket 42 is attached to the side wall 1208 inside the lower storage portion 18 below the counter table 16 and holds the dispenser body 2802 so that the longitudinal direction of the dispenser body 2802 is oriented in the vertical direction and that the nozzle 2804 is exposed from the lower storage portion 18 and positioned above the washbasin 22.

More specifically, the dispenser body 2802 of the liquid soap dispenser 28 is supported by the lower bracket 40 in a state of being able to be inserted or removed in a direction away from the side wall 1208, so as not to be able to move in the diametrical direction of the body portion 2806, or in other words, is supported in a direction so as not to be able to move in a direction orthogonal to the longitudinal direction of the dispenser body 2802 and so as not to be able to move downward.

Moreover, the dispenser body 2802 is supported by the upper bracket 42 so as not to be able to move upward and is also supported so as not to be able to move in the diametrical direction of the body portion 2806 except in the direction away from the side wall 1208.

As in the first and second embodiments, the actuator 32 is attached to the side wall 1208 on the side of the dispenser body 2802, not between the dispenser body 2802 and the side wall 1208.

Moreover, the actuator 32 is provided upside down with respect to the first and second embodiments.

In other words, the actuator 32 is configured to include: the frame 44 attached to the side wall 1208, the motor 46 supported at the upper portion of the frame 44, the guide plate 48 attached to the lower portion of the frame 44 and extending vertically, the screw shaft 50 that is rotated by the motor 46, and the vertically moving member 54 that supports the nut 52 that is engaged with the screw shaft 50 and is coupled so as to be able to slide vertically on the guide plate 48, and the actuator 32 is disposed in the lower storage portion 18.

The connecting member 34 connects the vertically moving member 54 and the nozzle 2804, and the connecting member 34 has: an attachment portion 3420 that is attached to the nozzle 2804 and extends from the section attached to the nozzle 2804 in a direction parallel to the side wall 1208 and away from the nozzle 2804; an upper side vertically extending portion 3422 extending downward from an end portion of the attachment portion 3420; an inclined portion 3424 that descends at an angle from a lower end of the upper side vertically extending portion 3422, along the cap 2810 and an upper surface of the dispenser body 2802, in parallel with the side wall 1208, and in a direction going away from the dispenser body 2802; and a lower side vertically extending portion 3426 that extends downward from a lower end of the inclined portion 3424 on the side of the dispenser body 2802, the lower end thereof being attached to the vertically moving member 54 via the bracket 3410.

The upper side vertically extending portion 3422 and the lower side vertically extending portion 3426 extend in the vertical direction.

Note that the human body detection unit 36 is provided at a section on the upper surface 1602 of the counter table 16 near the nozzle 2804 or at a section on the side wall 1208 near the nozzle 2804.

Figure 7:
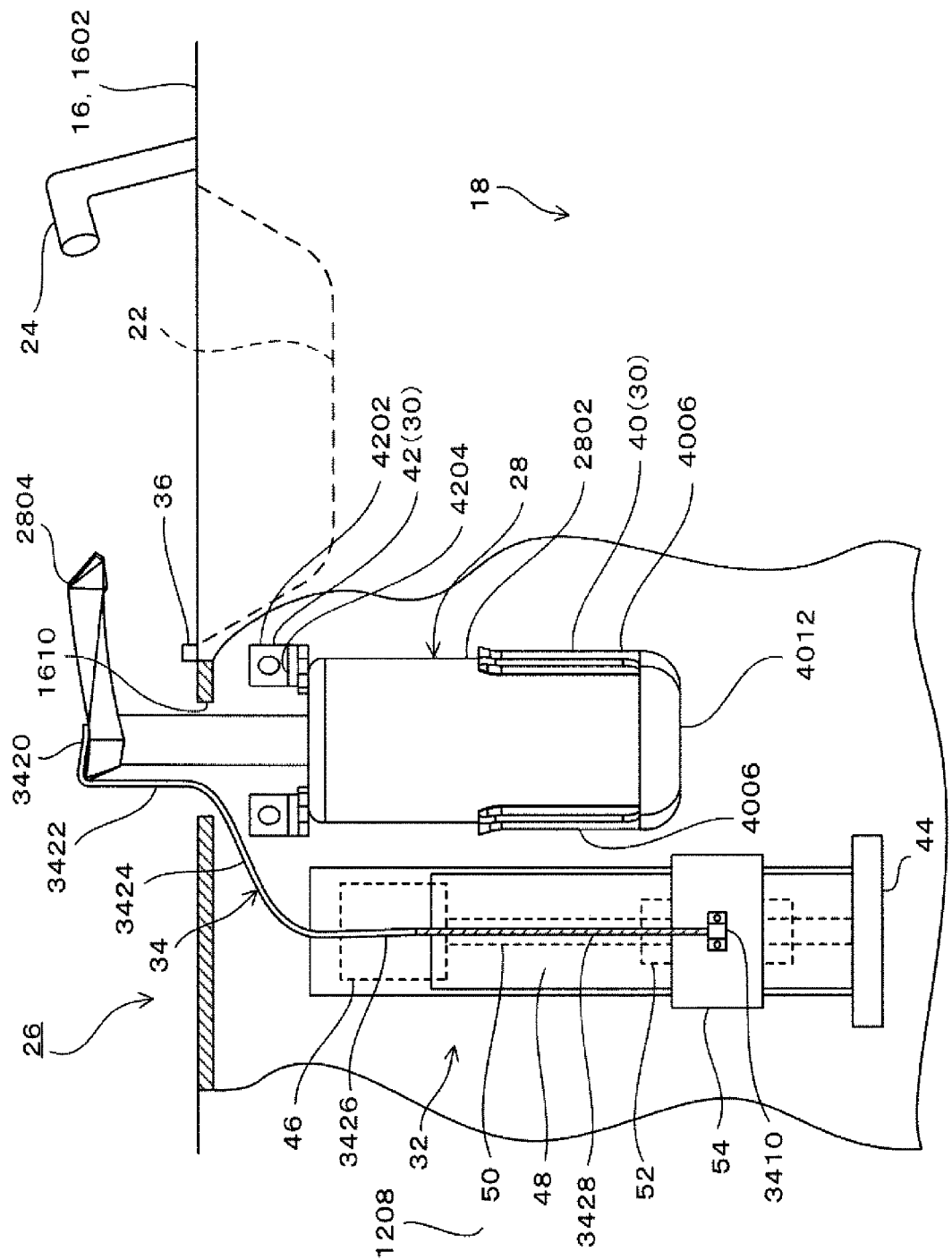
FIG. 7 is a front view illustrating a state in which an automatic liquid soap supplying mechanism according to a third embodiment is incorporated in a lower storage portion provided below a counter table.

Moreover, although the lower limit position sensor 56 and the upper limit position sensor 58 are omitted in FIG. 7, they are provided on the lower portion and the upper portion of the frame 44 of the actuator 32, respectively.

In the present embodiment, a flexible member 3428 is configured to extend from a lower end of the lower side vertically extending portion 3426 attached to the vertically moving member 54 by the bracket 30 to an intermediate portion in the vertical direction of the lower side vertically extending portion 3426; so even though the flexible member 3428 bends when the nozzle 2804 is pressed down by a hand, the flexible member 3428 is positioned inside the lower storage portion 18 and thus cannot be seen from the outside, allowing the appearance of the automatic liquid soap supplying mechanism 26 to be improved.

Note that even when the connecting member 34 is configured to include the flexible member 3428, when liquid soap is supplied, the vertically moving member 54 descends and presses down the nozzle 2804 via the flexible member 3428, and a tensile force acts on the flexible member 3428, so the liquid soap may be supplied without being hindered, and even though a portion or all of the upper side vertically extending portion 3422 and the lower side vertically extending portion 3426 is configured by the flexible member 3428, the flexible member 3428 does not come into contact with other sections when the nozzle 2804 is moved up and down by the vertically moving member body 54, and thus liquid soap may be supplied without being hindered.

The third embodiment as described above also achieves the same effect as that of the first embodiment.

Note that in the present embodiment, a case where the liquid soap dispenser 28 dispenses liquid soap from the nozzle 2804 by the nozzle 2804 being pressed by hand has been described; however, in the present technology, the liquid soap dispenser 28 includes a soap foam dispenser that dispenses soap foam in which liquid soap and air are mixed and dispensed from the nozzle 2804 by pressing the nozzle 2804 by hand.

The invention claimed is:

1. An automatic liquid soap supplying mechanism for an aircraft lavatory unit, the aircraft lavatory unit comprising:

a washbasin on a counter table above a floor; an automatic faucet that discharges water into the washbasin;

a storage portion provided below the counter table; and a liquid soap dispenser, the liquid soap dispenser comprising:

a dispenser body having a vertically long shape and storing liquid soap; and a nozzle provided at an end portion in a longitudinal direction of the dispenser body for dispensing the liquid soap stored in the dispenser body by being moved in the longitudinal direction, the automatic liquid soap supplying mechanism for an aircraft lavatory unit being provided with:

a bracket attached to a wall of the aircraft lavatory unit inside the storage portion below the counter table, the bracket holding the dispenser body such that the longitudinal direction of the dispenser body is in a vertical direction and such that the nozzle is exposed from the storage portion and positioned above the washbasin;

an actuator attached to the wall, disposed inside the storage portion, and having a vertically moving member that moves along the vertical direction on a side of the dispenser body and having a motor disposed on the side of the dispenser body between longitudinal ends of the dispenser body;

a connecting member that connects the vertically moving member and the nozzle;

a human body detection unit that detects that a hand is located near the nozzle; and a control unit that activates the actuator based on a detection result of the human body detection unit to move the vertically moving member along the longitudinal direction of the dispenser body, the actuator and the bracket being configured as separate elements which are horizontally spaced apart from each other and separately attached on the wall, the actuator and the bracket being indirectly connected to each other only via the wall of the aircraft lavatory.

2. The automatic liquid soap supplying mechanism for an aircraft lavatory unit according to claim 1, wherein the bracket comprises:

a lower bracket disposed at a lower portion of the dispenser body; and an upper bracket disposed at an upper portion of the dispenser body, and the dispenser body is supported by the lower bracket in a state of being able to be inserted and removed in a direction away from the wall, so as not to be able to move in a direction orthogonal to the longitudinal direction of the dispenser body and so as not to be able to move downward and is supported by the upper bracket so as not to be able to move upward.

3. The automatic liquid soap supplying mechanism for an aircraft lavatory unit according to claim 1, wherein the connecting member has a vertically extending portion that extends in the vertical direction, and at least a portion of the vertically extending portion is formed of a flexible member that is flexible.

4. The automatic liquid soap supplying mechanism for an aircraft lavatory unit according to claim 3, wherein at least a portion of the vertically extending portion that is formed of a flexible member that is flexible is located inside the storage portion.

* * * * *